May 11, 1926.
L. B. SNYDER
TOW ROD FOR VEHICLES
Filed Oct. 7, 1925
1,583,806
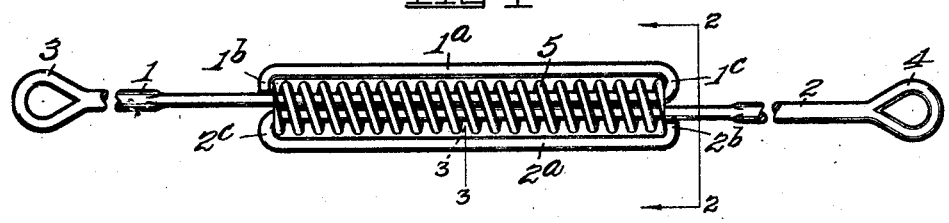
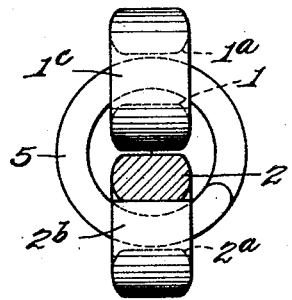
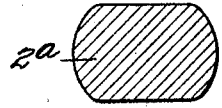
INVENTOR
L. B. Snyder.
BY
ATTORNEY Patented May 11, 1926.

1,583,806

UNITED STATES PATENT OFFICE.

LEN B. SNYDER, OF NEW MARTINSVILLE, WEST VIRGINIA.

TOW ROD FOR VEHICLES.

Application filed October 7, 1925. Serial No. 61,022.

This invention relates broadly to trailer hitches, and more specifically to a rod or pole for towing automobiles.

The primary object of the invention is to provide a tow-rod structure for automobiles which is readily yieldable in a lengthwise direction both under pulling and end-thrust strains for reducing the shocks incident to towing.

In describing the invention in detail, reference is herein had to the accompanying drawings, in which—

Figure 1 is a side elevation of the invention; and—

Figures 2 and 3 are sections taken, respectively, on lines 2—2 and 3—3, Fig. 1.

Referring to said drawings, 1 and 2 indicate the body portions of two similar metal rods which are terminated at their outer ends by eye portions 3 and 4, respectively, or by any other suitable form of coupling or attachment for making connection to a vehicle. Directed longitudinally through the interior of a heavy cylindrical coil spring 5 from opposite ends of the latter, said rods having their inner end portions $1^a$ and $2^a$ turned back and disposed parallel to and closely exterior to said spring. Said end portions, or members $1^a$ and $2^a$ have inturned lug-like terminals $1^b$ and $2^b$ which are spaced from the bends $1^c$ and $2^c$ a distance substantially corresponding to the length of the spring 5, said bends $1^c$ and $2^c$ resting upon opposite ends of said spring and the terminal lugs $1^b$ and $2^c$ being disposed, respectively, in seated enclosing relation to the ends opposite said bends.

While the rods 1 and 2 may be of cylindrical form throughout their lengths, it is preferred that they be flattened somewhat, as shown, in the portions which embrace the spring, thus to reduce the diameter of spring required and to lessen the cross sectional dimensions of the device in the part having the greatest width.

It will be manifest from the foregoing description that, under tensile strain, as in pulling, the spring is yieldingly compressed lengthwise between the bends $1^c$ and $2^c$ of the rods, producing a lengthening of the coupling pole described; also, that forces acting toward each other from opposite ends of the pole, as when a towed automobile tends to travel faster than the towing vehicle, the terminals $1^b$ and $2^b$ act upon opposite ends of the spring, which latter yieldingly resists the exerted force, serving in the capacity of a buffer.

What is claimed is—

1. A tow-rod for vehicles, comprising a compression spring of cylindrical coil form, and a pair of correspondingly shaped rods associated with said spring, said rods being directed longitudinally through said spring from opposite ends of the latter and each having its outer end adapted for attachment to a vehicle, said rods having their inner end portions bent back and disposed parallel to and exteriorly of said spring and having their terminal portions bent inward to form lugs, each rod having the return bend thereof seated upon one end of said spring and the terminal lug thereof seated upon the opposite end of said spring.

2. A tow-rod for vehicles, comprising a compression spring of cylindrical coil form, and a pair of correspondingly shaped rods associated with said spring, said rods being directed longitudinally through said spring from opposite ends of the latter and each having its outer end adapted for attachment to a vehicle, said rods having their inner end portions bent back and disposed parallel to and exteriorly of said spring and having their terminal portions bent inward into seated relation to the spring at the end opposite the return bend, the bends of each rod being spaced apart a distance substantially corresponding to the normal length of said spring.

In testimony whereof, I affix my signature.

LEN B. SNYDER.